United States Patent
Yonemoto et al.

(10) Patent No.: US 9,765,202 B2
(45) Date of Patent: Sep. 19, 2017

(54) RUBBER COMPOSITION AND TIRE PRODUCED BY USING THE SAME

(71) Applicants: BRIDGESTONE CORPORATION, Chuo-ku, Tokyo (JP); KAO CORPORATION, Chuo-ku, Tokyo (JP)

(72) Inventors: Makiko Yonemoto, Chuo-ku (JP); Tetsuo Takano, Wakayama (JP); Masaaki Tsuchihashi, Wakayama (JP)

(73) Assignees: BRIDGESTONE CORPORATION, Chuo-ku, Tokyo (JP); KAO CORPORATION, Chuo-ku, Tokyo (JP)

( * ) Notice: Subject to any disclaimer, the term of this patent is extended or adjusted under 35 U.S.C. 154(b) by 14 days.

(21) Appl. No.: 14/648,838

(22) PCT Filed: Dec. 18, 2013

(86) PCT No.: PCT/JP2013/083970
§ 371 (c)(1),
(2) Date: Jun. 1, 2015

(87) PCT Pub. No.: WO2014/098155
PCT Pub. Date: Jun. 26, 2014

(65) Prior Publication Data
US 2015/0315358 A1 Nov. 5, 2015

(30) Foreign Application Priority Data

Dec. 19, 2012 (JP) .................. 2012-277046

(51) Int. Cl.
| | |
|---|---|
| *C08K 5/11* | (2006.01) |
| *B60C 1/00* | (2006.01) |
| *C08K 3/36* | (2006.01) |
| *C08K 5/103* | (2006.01) |
| *C08K 5/54* | (2006.01) |
| *C08L 7/00* | (2006.01) |
| *C08L 9/06* | (2006.01) |
| *C08L 21/00* | (2006.01) |

(52) U.S. Cl.
CPC .................. *C08K 5/11* (2013.01); *B60C 1/00* (2013.01); *B60C 1/0016* (2013.04); *B60C 1/0025* (2013.04); *C08K 3/36* (2013.01); *C08K 5/103* (2013.01); *C08K 5/54* (2013.01); *C08L 7/00* (2013.01); *C08L 9/06* (2013.01); *C08L 21/00* (2013.01)

(58) Field of Classification Search
CPC . C08K 5/11; C08K 3/36; C08K 5/103; C08K 5/54; C08L 9/00; C08L 7/00; C08L 9/06; C08L 21/00; B60C 1/00; B60C 1/0016; B60C 1/0025
USPC ........................................................ 524/313
See application file for complete search history.

(56) References Cited

U.S. PATENT DOCUMENTS

| | | | |
|---|---|---|---|
| 5,714,533 A | 2/1998 | Hatakeyama et al. | |
| 5,717,022 A | 2/1998 | Beckmann et al. | |
| 6,559,209 B1 | 5/2003 | Araki et al. | |
| 2009/0292063 A1* | 11/2009 | Robert .................. | B60C 1/0016 524/518 |
| 2013/0317151 A1 | 11/2013 | Yagi et al. | |

FOREIGN PATENT DOCUMENTS

| | | | |
|---|---|---|---|
| JP | 60-13839 A | 1/1985 | |
| JP | S60-13839 A | * 1/1985 | ............. C08K 13/02 |
| JP | 62-62836 A | 3/1987 | |
| JP | 63-39935 A | 2/1988 | |
| JP | 63-113052 A | 5/1988 | |
| JP | 9-118786 A | 5/1997 | |
| JP | 2007-161822 A | 6/2007 | |
| JP | 2008-284827 A | 11/2008 | |
| JP | 2009-504810 A | 2/2009 | |
| KR | 10-2012-0058297 A | 6/2012 | |
| WO | 95/31888 A2 | 11/1995 | |
| WO | 97/35461 A2 | 10/1997 | |
| WO | 03/067558 A1 | 8/2003 | |
| WO | 2012070626 A1 | 5/2012 | |

OTHER PUBLICATIONS

JP S60-13839A—machine translation (Jan. 24, 1985).*
International Preliminary Report on Patentability dated Jul. 2, 2015 from the International Bureau in counterpart International Application No. PCT/JP2013/083970.
Database WPI, Week 201247, Thomson Scientific, London, GB; AN 2012-G80285 XP002759470 (Jun. 7, 2012); 1 page total.
Communication dated Jul. 20, 2016 from the European Patent Office in counterpart European application No. 13864451.3.

* cited by examiner

*Primary Examiner* — Ling Choi
*Assistant Examiner* — Ronald Grinsted
(74) *Attorney, Agent, or Firm* — Sughrue Mion, PLLC

(57) ABSTRACT

Rubber composition which improves dispersibility of silica and enhances processability by reducing viscosity of an unvulcanized rubber and which suppresses rubber scorching, inhibits shrinkage without delaying a vulcanization rate and improves a heat resistance, and a tire prepared by using the above rubber composition. Rubber composition prepared by blending at least one rubber component selected from a natural rubber and/or a diene base synthetic rubber with silica and a glycerin fatty acid ester composition, wherein a blend amount of the glycerin fatty acid ester composition is 0.5 to 15 parts by mass based on 100 parts by mass of the rubber component; the fatty acid has 8 to 28 carbon atoms; the glycerin fatty acid ester composition contains glycerin fatty acid monoester and glycerin fatty acid diester; and a content of the glycerin fatty acid monoester in the glycerin fatty acid ester composition is 85% by mass or less.

23 Claims, No Drawings

RUBBER COMPOSITION AND TIRE PRODUCED BY USING THE SAME

CROSS REFERENCE TO RELATED APPLICATIONS

This application is a National Stage of International Application No. PCT/JP2013/083970 filed Dec. 18, 2013, claiming priority based on Japanese Patent Application No. 2012-277046, filed Dec. 19, 2012, the contents of all of which are incorporated herein by reference in their entirety.

TECHNICAL FIELD

The present invention relates to a rubber composition and a tire produced by using the same, more specifically to a rubber composition which improves a dispersibility of silica in a rubber composition, and a tire prepared by using the above rubber composition.

BACKGROUND ART

In accordance with social demands to energy saving in recent years, silica is blended and used so frequently as a filler which causes a low heat generating property of a rubber composition for tires to be consistent with a gripping property of a tire on a wet road surface for the purpose of saving fuel consumption of automobiles.

Silica used tends to cause coagulation of particles themselves by virtue of a hydrogen bond of a silanol group which is a surface functional group, and in order to improve a dispersibility of silica in a rubber, a kneading time has to be elongated. Also, silica has the defect that a Mooney viscosity of a rubber composition is raised due to an unsatisfactory dispersibility of silica in a rubber and that the rubber composition is inferior in a processability such as extrusion. Further, the surface of silica is acidic, and therefore it involves the defect that it adsorbs thereon basic substances which are used as a vulcanization accelerator to prevent the rubber composition from being sufficiently vulcanized and that the storage modulus is not enhanced. Accordingly, silica-blended rubber compositions have so far been desired to be improved in a processability and the like.

There have so far been known as a technology for improving a processability and the like in a silica-blended rubber composition prepared by using glycerin fatty acid esters, for example:

1) a rubber composition improved in an electrostatic property which is prepared by blending 100 parts by weight of a rubber containing 90 parts by weight or more of a diene base rubber with 30 to 120 parts by weight of a filler containing 40% by weight or more of a white filler and 0.2 to 8 parts by weight of a nonionic surfactant (refer to, for example, a patent document 1, and
2) a rubber composition for a tire tread containing at least one polymer selected from the group of diene base rubbers, and 5 to 100 parts by weight of fine powder non-precipitated silicic acid, 0 to 80 parts by weight of carbon black, and 5 to 80 parts by weight of at least one non-aromatic viscosity-reducing substance each based on 100 parts by weight of a rubber contained in the rubber composition,
wherein the non-aromatic viscosity-reducing substance described above is at least one substance selected from the group consisting of glycerin monostearate, sorbitan monostearate, sorbitan monooleate, and trimethylolpropane(2-ethyl-2-hydroxymethyl-1,3-propanediol) (refer to, for example, a patent document 2).

On the other hand, known as a technology for improving a dispersibility of silica in a rubber, a processability and the like in a silica-blended rubber composition prepared by using compounds other than the glycerin fatty acid esters described above are, for example:

3) (A) a composition prepared by blending 15 to 85 parts by weight of silica based on 100 parts by mass of a rubber component containing a natural rubber and/or a diene base synthetic rubber, and a specific tertiary amine compound such as dimethylalkylamine and the like in a proportion of 1 to 15% by weight based on an amount of the silica, and a pneumatic tire prepared by using the above composition for a tire tread (refer to, for example, a patent document 3), and
4) a rubber composition for a tire tread prepared by blending 100 parts by weight of a rubber composition containing a natural rubber and/or a diene base rubber with a white filler and at least one specific monoalkanolamide, and a tire prepared by using the above composition (refer to, for example, a patent document 4).

It is described in the patent document 1 out of the patent documents 1 to 4 that glycerin fatty acid monoester is blended in one of the examples to obtain an effect of preventing electrification which is likely to be caused in blending silica and which is different from that of the present invention, but a viscosity-reducing effect is neither described nor suggested therein.

Also, a technology close to the present invention is disclosed in the patent documents 2 described above, and it is described therein that glycerin fatty acid monoester is blended to obtain a viscosity-reducing effect in blending silica. However, shrink (deterioration of a processability caused by shrinkage) which is likely to be caused in blending a silica-blended rubber composition with the glycerin fatty acid monoester is neither described nor suggested therein.

Further, the rubber compositions prepared in the patent documents 3 and 4 described above are improved in a dispersibility of silica in a rubber and a heat generating property to such an extent as has not so far been observed, but it is reduced slightly in a processability due to shrinkage. Also, the problem that the scorch time is expedite to cause rubber yellowing is brought about in the patent document 3.

PRIOR ART DOCUMENTS

Patent Documents

Patent document 1: International Publication WO95/31888 (claims, examples and the like)
Patent document 2: JP-A Hei 9-118786 (claims, examples and the like)
Patent document 3: International Publication WO97/35461 (claims, examples and the like)
Patent document 4: International Publication WO/2012/070626 (claims, examples and the like)

DISCLOSURE OF THE INVENTION

The present invention intends to solve the problems on the conventional technologies described above and the like, and an object thereof is to provide a rubber composition which improves a dispersibility of silica in a rubber composition and enhances a processability by reducing a viscosity of an unvulcanized rubber and which suppresses rubber yellowing, inhibits shrinkage without delaying a vulcanization rate and improves a heat resistance, a tire prepared by using the above rubber composition, and a viscosity reduction method for an unvulcanized rubber.

In the light of the problems on the conventional technologies described above and the like, intense investigations repeated by the present inventors have resulted in finding that a rubber composition which meets the object described above, a tire prepared by using the above rubber composition and a viscosity reduction method for an unvulcanized rubber are obtained by blending at least one rubber component selected from a natural rubber and/or a diene base synthetic rubber with silica and a specific compound, and thus, the present inventors have come to complete the present invention.

That is, the present invention resides in the following items (1) to (19).

(1) A rubber composition prepared by blending at least one rubber component selected from a natural rubber and/or a diene base synthetic rubber with silica and a glycerin fatty acid ester composition, wherein a blend amount of the glycerin fatty acid ester composition is 0.5 to 15 parts by mass based on 100 parts by mass of the rubber component; the fatty acid has 8 to 28 carbon atoms; the glycerin fatty acid ester composition comprises glycerin fatty acid monoester and glycerin fatty acid diester; and a content of the glycerin fatty acid monoester in the glycerin fatty acid ester composition is 85% by mass or less.

(2) The rubber composition as described in the above item (1), wherein a content of the glycerin fatty acid monoester in the glycerin fatty acid ester composition is 35 to 85% by mass.

(3) The rubber composition as described in the above item (1) or (2), wherein a content of the glycerin fatty acid diester in the glycerin fatty acid ester composition is 10 to 65% by mass.

(4) The rubber composition as described in any one of the above items (1) to (3), wherein a mass ratio of the glycerin fatty acid monoester/the glycerin fatty acid diester in the glycerin fatty acid ester composition is 0.5 to 10.

(5) The rubber composition as described in any one of the above items (1) to (4), wherein a content of the glycerin fatty acid monoester in the glycerin fatty acid ester composition is 50 to 85% by mass; and a total content of the glycerin fatty acid diester and glycerin fatty acid triester is 15 to 50% by mass.

(6) The rubber composition as described in any one of the above items (1) to (5), wherein a content of the glycerin fatty acid monoester in the glycerin fatty acid ester composition is 50 to 85% by mass, and a content of the glycerin fatty acid diester is 15 to 50% by mass.

(7) The rubber composition as described in any one of the above items (1) to (4), wherein a content of the glycerin fatty acid triester in the glycerin fatty acid ester composition is 10% by mass or less.

(8) The rubber composition as described in any one of the above items (1) to (7), wherein a blend amount of the glycerin fatty acid ester composition is 0.5 to 20 parts by mass based on 100 parts by mass of the silica.

(9) The rubber composition as described in any one of the above items (1) to (8), obtained by blending at least one rubber component selected from the natural rubber and/or the diene base synthetic rubber with the silica and the glycerin fatty acid ester composition and then kneading and vulcanizing the mixture.

(10) A rubber composition prepared by blending at least one rubber component selected from a natural rubber and/or a diene base synthetic rubber with silica, glycerin fatty acid monoester and glycerin fatty acid diester, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

(11) The rubber composition as described in the above item (10), wherein 0.25 to 10 parts by mass of the glycerin fatty acid monoester based on 100 parts by mass of the rubber component is blended.

(12) The rubber composition as described in the above item (10) or (11), wherein 0.25 to 10 parts by mass of the glycerin fatty acid diester based on 100 parts by mass of the rubber component is blended.

(13) The rubber composition as described in any one of the above items (10) to (12), obtained by blending at least one rubber component selected from the natural rubber and/or the diene base synthetic rubber with the silica, the glycerin fatty acid monoester and the glycerin fatty acid diester and then kneading and vulcanizing the mixture.

(14) The rubber composition as described in any one of the above items (1) to (13), wherein 5 to 200 parts by mass of the silica based on 100 parts by mass of the rubber component is blended.

(15) The rubber composition as described in any one of the above items (1) to (14), further blended with a silane coupling agent.

(16) A production process for the rubber composition as described in any one of the above items (1) to (15), comprising a step of blending at least one rubber component selected from a natural rubber and/or a diene base synthetic rubber with silica and glycerin fatty acid ester to obtain a mixture and then kneading and vulcanizing the mixture.

(17) A tire prepared by using the rubber composition as described in any one of the above items (1) to (15) for a tire member.

(18) A viscosity reduction method for an unvulcanized rubber prepared by blending at least one rubber component selected from a natural rubber and/or a diene base synthetic rubber with silica and a glycerin fatty acid ester composition, wherein a blend amount of the glycerin fatty acid ester composition is 0.5 to 15 parts by mass based on 100 parts by mass of the rubber component; the fatty acid has 8 to 28 carbon atoms; the glycerin fatty acid ester composition contains glycerin fatty acid monoester and glycerin fatty acid diester; and a content of the glycerin fatty acid monoester in the glycerin fatty acid ester composition is 85% by mass or less.

(19) A viscosity reduction method for an unvulcanized rubber prepared by blending at least one rubber component selected from a natural rubber and/or a diene base synthetic rubber with silica, glycerin fatty acid monoester and glycerin fatty acid diester, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

According to the present invention, provided are a rubber composition which improves a dispersibility of silica and enhances a processability by reducing a viscosity of an unvulcanized rubber and which suppresses rubber yellowing, inhibits shrinkage without delaying a vulcanization rate and improves a heat resistance, a tire prepared by using the above rubber composition, and a viscosity reduction method for an unvulcanized rubber.

MODE FOR CARRYING OUT THE INVENTION

The rubber composition of the first embodiment according to the present invention is characterized by a rubber composition prepared by blending at least one rubber component selected from a natural rubber and/or a diene base synthetic rubber with silica and a glycerin fatty acid ester composition, wherein the fatty acid has 8 to 28 carbon atoms; the above composition comprises glycerin fatty acid monoester and glycerin fatty acid diester; and a content of the glycerin fatty acid monoester in the above composition is 85% by mass or less.

The rubber composition of the second embodiment according to the present invention is characterized by a rubber composition prepared by blending at least one rubber component selected from a natural rubber and/or a diene base synthetic rubber with silica, glycerin fatty acid monoester and glycerin fatty acid diester, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

The embodiments of the present invention shall be explained below in detail, and the items common to the first and second embodiments shall be described. Also in the viscosity reduction method for an unvulcanized rubber according to the present invention, the preferred embodiment is the same as in the first and second embodiments.

Rubber Component:

The rubber component used for the rubber composition of the present invention comprises a natural rubber and/or a diene base synthetic rubber. In this connection, the natural rubber (NR) includes RSS, TSR#10, TSR#20 and the like which are usually used for tires, and in addition thereto, it includes a viscosity stabilizer-containing natural rubber, a high purified natural rubber, an enzyme-treated natural rubber, a saponification-treated natural rubber and the like. Capable of being used as the viscosity stabilizer are, for example, hydroxylamine sulfate, semicarbazide [$(NH_2NHCONH)_2$] or salts thereof, hydroxylamine, hydrazide compounds (for example, propionic acid hydrazide) and the like. The high purified natural rubber is a natural rubber obtained, for example, by subjecting a natural rubber latex to centrifugal separation to remove non-rubber components such as protein and the like. The enzyme-treated natural rubber is a natural rubber obtained by subjecting a natural rubber to enzyme treatment with enzymes such as protease, lipase, phospholipase and the like. The saponification-treated natural rubber is a natural rubber obtained by subjecting a natural rubber to saponification treatment with alkalis (for example, NaOH) and the like.

The diene base synthetic rubber includes polyisoprene rubbers (IR), polybutadiene rubbers (BR), styrene-butadiene copolymer rubbers (SBR), butyl rubbers (IIR), ethylene-propylene copolymers and the like. The above diene base synthetic rubbers may be modified polymers or may be used by blending diene base synthetic rubbers (non-modified polymers) with modified polymers.

The above rubber components may be used alone or in a blend of two or more kinds thereof.

Silica:

The silica which can be used for the rubber composition of the present invention shall not specifically be restricted, and commercial products used for rubber compositions can be used. Among them, wet silica (hydrous silicic acid), dry silica (anhydrous silicic acid), colloidal silica, and the like can be used, and particularly wet silica is preferably used.

Particularly preferred is silica having a BET specific surface area of 50 to 300 $m^2/g$ and a CTAB specific surface area (cetyltrimethylammonium bromide-adsorbing specific surface area) of 50 to 300 $m^2/g$, and the higher the BET specific surface area and the CTAB specific surface area are, the more the unvulcanized rubber viscosity is reduced. In the present invention, the BET specific surface area is measured by one point value in a BET method. Also, the CTAB specific surface area (cetyltrimethylammonium bromide-adsorbing specific surface area) is a value measured according to ASTM D3765.

A blend amount of the above silicas is preferably 5 parts by mass or more, more preferably 10 parts by mass or more, further preferably 20 parts by mass or more and further more preferably 60 parts by mass or more based on 100 parts by mass of the rubber component described above from the viewpoint of the effect of lowering the hysteresis. From the viewpoint of enhancing the workability, the blend amount is preferably 200 parts by mass or less, more preferably 150 parts by mass or less and further preferably 120 parts by mass or less, and it falls in a range of preferably 5 to 200 parts by mass, more preferably 10 to 150 parts by mass, further preferably 20 to 120 parts by mass and further more preferably 60 to 120 parts by mass. In the case of the present invention, the effects of the present invention can be exerted even when a blend amount of the silica is as high as 60 parts by mass or more based on 100 parts by mass of the rubber component.

Silane Coupling Agent:

In the present invention, a silane coupling agent is preferably used from the viewpoint of the reinforcing property.

The silane coupling agent which can be used shall not specifically be restricted and includes, for example, at least one of bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltrimethoxysilane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, 3-nitropropyldimethoxymethylsilane, 3-chloropyldimethoxymethylsilane, dimethoxymethylsilylpropyl-N,N-dimethylthiocarbamoyl tetrasulfide, dimethoxymethylsilylpropylbenzothiazole tetrasulfide, and the like.

A blend amount of the silane coupling agent is, though varied according to a blend amount of the silica, preferably 1 part by mass or more, more preferably 4 parts by mass or more based on 100 parts by mass of the silica from the viewpoint of the reinforcing property, and on the other hand, from the viewpoint of maintaining the heat generating property, it is preferably 20 parts by mass or less, more preferably 12 parts by mass or less. A blend amount of the silane coupling agent is preferably 1 to 20 parts by mass based on 100 parts by mass of the silica, and it is more preferably 4 to 12 parts by mass from the viewpoint of the heat generating property.

In the present invention, carbon blacks can be used in combination as a reinforcing filler in addition to the silica described above.

The carbon blacks which can be used shall not specifically be restricted, and the grades of, for example, FEF, SRF, HAF, ISAF, SAF and the like can be used.

A blend amount of the above carbon blacks shall not specifically be restricted as well, and it is preferably 0 to 60 parts by mass, more preferably 10 to 50 parts by mass based on 100 parts by mass of the rubber component described above. It is preferably 60 parts by mass or less from the viewpoint of maintaining the heat generating property.

Rubber Composition of the First Embodiment:

The rubber composition of the first embodiment in the present invention is characterized by a rubber composition prepared by blending at least one rubber component selected from a natural rubber and/or a diene base synthetic rubber with silica and a glycerin fatty acid ester composition, wherein the fatty acid has 8 to 28 carbon atoms; the glycerin fatty acid ester contains glycerin fatty acid monoester and glycerin fatty acid diester; and a content of the glycerin fatty acid monoester in the above composition is 85% by mass or less. The glycerin fatty acid ester composition used in the first embodiment shall be described below.

Glycerin Fatty Acid Ester Composition:

He glycerin fatty acid ester in the glycerin fatty acid ester composition is obtained by subjecting at least one of 3 OH groups of glycerin to ester bonding with fatty acid (having 8 to 28 carbon atoms), and it is classified into glycerin fatty acid monoester, glycerin fatty acid diester and glycerin fatty acid triester according to the number of the fatty acids bonded to glycerin.

The glycerin fatty acid ester composition used in the present invention contains glycerin fatty acid monoester and glycerin fatty acid diester, and in addition thereto, it may contain glycerin fatty acid triester and glycerin.

In the present invention, the fatty acid constituting the glycerin fatty acid ester has 8 or more carbon atoms, preferably 10 or more carbon atoms, more preferably 12 or more carbon atoms and further preferably 16 or more carbon atoms from the viewpoint of reducing a viscosity of the unvulcanized rubber, and it has 28 or less carbon atoms, preferably 22 or less carbon atoms and more preferably 18 or less carbon atoms from the viewpoint of enhancing the heat resistance. The fatty acid constituting the glycerin fatty acid ester is fatty acid having 8 to 28 carbon atoms, preferably 8 to 22 carbon atoms, further preferably 10 to 18 carbon atoms and further more preferably 12 to 18 carbon atoms from the viewpoints of improving the processability by reducing a viscosity of the unvulcanized rubber, inhibiting the shrinkage and enhancing the heat resistance. Also, the fatty acid may be any of saturated, unsaturated, linear and branched ones, and linear saturated fatty acids are particularly preferred. The specific examples of the fatty acid include capric acid, lauric acid, myristic acid, palmitic acid, stearic acid, isostearic acid, oleic acid, linoleic acid, and the like. They are preferably lauric acid, palmitic acid and stearic acid, and palmitic acid and stearic acid are particularly preferred.

Fatty acids having less than 8 carbon atoms have a low affinity with polymers and are liable to cause blooming. On the other hand, fatty acids having 28 or more carbon atoms are not different from fatty acids having 28 or less carbon atoms in an effect of improving the processability and elevate the cost, and therefore they are not preferred.

In the glycerin fatty acid ester composition used in the present invention, the fatty acid has 8 to 28 carbon atoms, and the glycerin fatty acid ester contains glycerin fatty acid monoester and glycerin fatty acid diester. In the composition, a content of the glycerin fatty acid monoester is 85% by mass or less. Blending of the glycerin fatty acid ester composition makes it possible to inhibit the shrinkage and the rubber yellowing, enhance the processability by reducing a viscosity of the silica-blended unvulcanized rubber without delaying the vulcanization rate and achieve various performances such as the heat resistance to a high degree.

In the present invention, the glycerin fatty acid ester composition in which a content of monoester exceeds 85% by mass causes large shrinkage and raises concerns about the workability. Also, it reduces a heat resistance of the vulcanized rubber to a large extent.

Accordingly, a content of the monoester in the glycerin fatty acid ester composition is preferably 35% by mass or more, more preferably 40% by mass or more, further preferably 45% by mass or more and further more preferably 50% by mass or more from the viewpoint of reducing a viscosity of the unvulcanized rubber, and from the viewpoints of controlling the scorch, inhibiting the shrinkage and enhancing the heat resistance, it is 85% by mass or less, preferably 80% by mass or less, more preferably 75% by mass or less, preferably 35 to 85% by mass, more preferably 40 to 85% by mass, further preferably 45 to 85% by mass, further more preferably 50 to 85% by mass, further preferably 50 to 80% by mass and further more preferably 50 to 75% by mass.

A content of the glycerin fatty acid diester in the glycerin fatty acid ester composition is preferably 10% by mass or more, further preferably 15% by mass or more and further more preferably 20% by mass or more from the viewpoints of inhibiting the shrinkage, controlling the scorch and improving the heat resistance, and from the viewpoint of reducing a viscosity of the unvulcanized rubber, it is preferably 65% by mass or less, more preferably 55% by mass or less, further preferably 50% by mass or less, preferably 10 to 65% by mass, more preferably 15 to 55% by mass, further preferably 15 to 50% by mass and further more preferably 20 to 50% by mass.

A mass ratio of the glycerin fatty acid monoester/the glycerin fatty acid diester in the composition described above is preferably 0.5 or more, more preferably 0.8 or more, further preferably 0.9 or more and further more preferably 1.0 or more from the viewpoint of reducing a viscosity of the unvulcanized rubber, and it is preferably 10 or less, more preferably 8 or less, further preferably 6 or less, further more preferably 5 or less, further preferably 4 or less and further more preferably 3 or less from the viewpoints of inhibiting the shrinkage, controlling the scorch and improving the heat resistance.

A content of the glycerin fatty acid triester in the glycerin fatty acid ester composition is preferably 10% by mass or less, more preferably 5% by mass or less and further preferably 3% by mass or less from the viewpoint of preventing the rubber physical properties after vulcanized from being excessively reduced (reduction of the storage elastic modulus, and the like), and it may be 0.3% by mass or more from the viewpoint of the productivity.

A total content of the glycerin fatty acid monoester and the glycerin fatty acid triester in the glycerin fatty acid ester composition is preferably 15 to 50% by mass, more preferably 17 to 50% by mass from the viewpoints of reducing a viscosity of the unvulcanized rubber, inhibiting the shrinkage and improving the heat resistance.

In particular, the glycerin fatty acid ester composition in which a content of the glycerin fatty acid monoester is 50 to 85% by mass and in which a total content of the glycerin fatty acid diester and the glycerin fatty acid triester is 15 to 50% by mass is preferred from the viewpoints of reducing a viscosity of the unvulcanized rubber, inhibiting the shrinkage, controlling the scorch and improving the heat resistance, and the glycerin fatty acid ester composition in which a content of the glycerin fatty acid monoester is 50 to 80% by mass and in which a total content of the glycerin fatty acid monoester and the glycerin fatty acid triester is 17 to 50% by mass is further preferred. Also, the glycerin fatty acid ester composition in which a content of the glycerin fatty acid monoester is 50 to 85% by mass and in which a content of the glycerin fatty acid diester is 15 to 50% by mass is preferred, and the glycerin fatty acid ester composition in which a content of the glycerin fatty acid monoester is 50 to 80% by mass and in which a content of the glycerin fatty acid diester is 20 to 50% by mass is further preferred.

In producing the glycerin fatty acid ester composition used in the present invention, glycerin remains as an unreacted raw material in a certain case. A content of the glycerin in the glycerin fatty acid ester composition is preferably 10% by mass or less, more preferably 5% by mass or less and further preferably 3% by mass or less from the viewpoint of inhibiting a reduction in the heat resistance, and it may be 0.3% by mass or more from the viewpoint of the productivity.

Two or more kinds of the glycerin fatty acid ester compositions which are different in a content of the glycerin fatty acid monoester and a content of the glycerin fatty acid diester may be used.

The glycerin fatty acid ester composition used in the present invention can be produced by an esterification method in which it is produced from glycerin obtained by decomposing oils and fats and fatty acid and a transesterification method in which it is produced by using oils and fats and glycerin as raw materials, and a method for producing the glycerin fatty acid ester composition in which an amount of monoester is controlled includes the respective methods of 1) to 3) shown below:

1) A method in which an equilibrium composition of esterification is controlled by changing a charge ratio of a fatty acid component and a glycerin component in the esterification method and the transesterification method each described above. Glycerin can be removed by further distilling. Provided that an upper limit amount of the glycerin fatty acid monoester is considered to be about 65% by mass in the light of the reaction characteristics.
2) A method in which reaction products obtained by the esterification method and the transesterification method are further fractionated and distilled off by molecular distillation to obtain glycerin fatty acid monoester of a high purity (usually 95% by mass or more).
3) A method in which the high purity glycerin fatty acid monoester obtained by the method of 2) described above and the middle purity glycerin fatty acid monoester obtained by the method of 1) are mixed in an optional ratio to thereby obtain glycerin fatty acid monoester of a relatively high purity region (about 65 to 95% by mass).

Glycerin fatty acid esters which are reduced in environmental load can be used by using the oils and fats and the fatty acids of the raw materials described above which are derived from natural products.

Further, commercial products in which an amount of monoester is controlled can be used for the glycerin fatty acid ester composition used in the present invention, and the examples of the commercial products include, for example, stearic acid monoglyceride (Leodol MS-60, Excel S-95, manufactured by Kao Corporation) and the like.

In the present invention, a monoglyceride content (glycerin fatty acid monoester content) in the glycerin fatty acid ester composition shows a value determined according to the following equation (I) by GPC (gel permeation chromatography) analysis, and it means an area ratio of monoglyceride to a sum of glycerin, monoglyceride, diglyceride (glycerin fatty acid diester) and triglyceride (glycerin fatty acid triester) in the GPC analysis:

$$\text{monoglyceride content (area \%)} = \frac{MG}{[G + MG + DG + TG]} \times 100 \quad \text{(I)}$$

in the equation (I) described above, G is a glycerin area of GPC; MG is a monoglyceride area of GPC; DG is a diglyceride area of GPC; and TG is a triglyceride area of GPC.

The measuring conditions of GPC are shown below.

Measuring Conditions of GPC

The GPC was measured by means of the following measuring equipment, and THF (tetrahydrofuran) as an eluent was caused to flow at a flow rate of 0.6 ml/minute to stabilize a column in a thermostatic bath of 40° C. A sample solution 10 μl of 1% by weight prepared by dissolving the sample in THF was injected into the column to measure GPC.

Standard substance: monodispersed polystyrene
Detector: RI-8022 (manufactured by Tosoh Corporation)
Measuring equipment: HPLC-8220 GPC (manufactured by Tosoh Corporation)
Analytical column: two columns of TSK-GEL SUPER H1000 and two columns of TSK-GEL SUPER H2000 (manufactured by Tosoh Corporation) which were connected in series Similarly, a content of the diglyceride in the glycerin fatty acid ester composition means an area ratio of diglyceride to a sum of glycerin, monoglyceride, diglyceride and triglyceride.

The examples of the glycerin fatty acid ester composition in which an amount of usable monoester is controlled include, for example, a glyceryl caprylate-containing composition in which fatty acid has 8 carbon atoms, a glyceryl decanoate-containing composition in which fatty acid has 10 carbon atoms, a glyceryl laurate-containing composition in which fatty acid has 12 carbon atoms, a glyceryl myristate-containing composition in which fatty acid has 14 carbon atoms, a glyceryl palmitate-containing composition in which fatty acid has 16 carbon atoms, a glyceryl stearate-containing composition in which fatty acid has 18 carbon atoms, a glyceryl behenate-containing composition in which fatty acid has 22 carbon atoms, and a glyceryl montanate-containing composition in which fatty acid has 28 carbon atoms, and among them, the glyceryl laurate-containing composition, the glyceryl palmitate-containing composition and the glyceryl stearate-containing composition are preferred. The above glycerin fatty acid ester compositions in which an amount of monoester is controlled are optionally selected alone or in a mixture of two or more kinds thereof and blended.

A blend amount of the glycerin fatty acid ester composition used in the present invention is preferably 0.5 part by mass or more, more preferably 1 part by mass or more, further preferably 1.5 part by mass or more, further preferably 2 parts by mass or more and further more preferably 3 parts by mass or more based on 100 parts by mass of the rubber component from the viewpoint of reducing a viscosity of the unvulcanized rubber, and it is preferably 15 parts by mass or less, more preferably 10 parts by mass or less, further preferably 8 parts by mass or less, preferably 0.5 to 15 parts by mass, more preferably 1 to 10 parts by mass, further preferably 2 to 10 parts by mass, further more preferably 3 to 10 parts by mass, and further more preferably 3 to 8 parts by mass from the viewpoints of inhibiting the rubber physical properties after vulcanized from being excessively reduced (reduction of the storage elastic modulus, and the like), controlling the scorch and inhibiting the shrinkage.

Also, a blend amount of the glycerin fatty acid ester composition is preferably 0.5 part by mass or more, more preferably 1 part by mass or more, further preferably 2 parts by mass or more and further more preferably 4 parts by mass or more based on 100 parts by mass of the silica from the viewpoint of reducing a viscosity of the unvulcanized rubber, and it is preferably 20 parts by mass or less, more preferably 15 parts by mass or less, further preferably 12 parts by mass or less, further more preferably 10 parts by mass or less, preferably 0.5 to 20 parts by mass, more preferably 1 to 15 parts by mass, further more preferably 2 to 12 parts by mass, and further more preferably 4 to 10 parts by mass from the viewpoint of inhibiting the rubber physical properties after vulcanized from being excessively reduced (reduction of the storage elastic modulus, and the like).

Rubber Composition of the Second Embodiment:

The rubber composition of the second embodiment in the present invention is characterized by a rubber composition prepared by blending at least one rubber component selected from a natural rubber and/or a diene base synthetic rubber with silica, glycerin fatty acid monoester and glycerin fatty acid diester, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10. The preferred fatty acids are the same as in the first embodiment.

The rubber composition of the second embodiment is obtained preferably by blending the rubber component described above with the glycerin fatty acid ester composition used in the first embodiment alone or in a mixture of two or more kinds thereof. For example, the glycerin fatty acid monoester, the glycerin fatty acid diester and the like of a high purity may be blended separately.

A total blend amount of the glycerin fatty acid monoester and the glycerin fatty acid diester is preferably 0.5 part by mass or more, more preferably 1 part by mass or more, further preferably 2 parts by mass or more and further more preferably 3 parts by mass or more based on 100 parts by mass of the rubber component from the viewpoint of reducing a viscosity of the unvulcanized rubber, and it is preferably 15 parts by mass or less, more preferably 10 parts by mass or less, further preferably 8 parts by mass or less, preferably 0.5 to 15 parts by mass, more preferably 1 to 10 parts by mass, further preferably 2 to 10 parts by mass, further more preferably 3 to 10 parts by mass, and further more preferably 3 to 8 parts by mass from the viewpoint of inhibiting the rubber physical properties after vulcanized from being excessively reduced (reduction of the storage elastic modulus, and the like).

Also, a blend mass ratio of the glycerin fatty acid monoester/the glycerin fatty acid diester is preferably 0.5 or more, more preferably 0.8 or more, further preferably 0.9 or more the further more preferably 1.0 or more from the viewpoint of reducing a viscosity of the unvulcanized rubber, and it is preferably 10 or less, more preferably 8 or less, further preferably 6 or less, further more preferably 5 or less, further preferably 4 or less and further more preferably 3 or less from the viewpoints of inhibiting the shrinkage, controlling the scorch and improving the heat resistance.

The glycerin fatty acid monoester is blended in an amount of preferably 0.25 part by mass or more, more preferably 0.5 part by mass or more, further more preferably 1 part by mass or more and further more preferably 2 parts by mass or more based on 100 parts by mass of the rubber component from the viewpoint of reducing a viscosity of the unvulcanized rubber, and it is blended in an amount of preferably 10 parts by mass or less, more preferably 8 parts by mass or less and further more preferably 5 parts by mass or less from the viewpoint of inhibiting the rubber physical properties after vulcanization from being excessively reduced (reduction of the storage elastic modulus, and the like).

The glycerin fatty acid diester is blended in an amount of preferably 0.25 part by mass or more, more preferably 0.5 part by mass or more and further more preferably 1 part by mass or more based on 100 parts by mass of the rubber component described above from the viewpoints of inhibiting the shrinkage, controlling the scorch and improving the heat resistance, and it is blended in an amount of preferably 10 parts by mass or less, more preferably 8 parts by mass or less and further more preferably 5 parts by mass or less from the viewpoint of inhibiting the rubber physical properties after vulcanization from being excessively reduced (reduction of the storage elastic modulus, and the like).

A total blend amount of the glycerin fatty acid monoester and the glycerin fatty acid diester is preferably 0.5 part by mass or more, more preferably 1 part by mass or more, further preferably 2 parts by mass or more and further more preferably 4 parts by mass or more based on 100 parts by mass of the silica from the viewpoint of reducing a viscosity of the unvulcanized rubber, and it is preferably 20 parts by mass or less, more preferably 15 parts by mass or less, further preferably 12 parts by mass or less, further more preferably 10 parts by mass or less, preferably 0.5 to 20 parts by mass, more preferably 1 to 15 parts by mass, further more preferably 2 to 12 parts by mass, and further more preferably 4 to 10 parts by mass from the viewpoint of inhibiting the rubber physical properties after vulcanized from being excessively reduced (reduction of the storage elastic modulus, and the like).

The rubber composition of the second embodiment in the present invention is blended with the glycerin fatty acid monoester and the glycerin fatty acid diester, and it may be blended with glycerin fatty acid triester and glycerin as long as the effects of the present invention are not damaged.

A blend amount of the glycerin is preferably 0.5 part by mass or less, further preferably 0.3 part by mass or less and further more preferably 0.1 part by mass or less based on 100 parts by mass of at least one rubber component selected from the natural rubber and/or the diene base synthetic rubber from the viewpoint of inhibiting a reduction of the heat resistance, and it may be 0.01 part by mass or more from the viewpoint of the productivity.

A blend amount of the glycerin fatty acid triester is preferably 0.5 part by mass or less, further preferably 0.3 part by mass or less and further more preferably 0.1 part by mass or less based on 100 parts by mass of the rubber component from the viewpoint of inhibiting the rubber physical properties after vulcanized from being excessively reduced (reduction of the storage elastic modulus, and the like), and it may be 0.01 part by mass or more from the viewpoint of the productivity.

A mass ratio [glycerin fatty acid monoester/(glycerin fatty acid monoester+glycerin fatty acid diester+glycerin fatty acid triester+glycerin)] of a blend amount of the glycerin fatty acid monoester to a total blend amount of the glycerin fatty acid monoester, the glycerin fatty acid diester, the glycerin fatty acid triester and the glycerin which are blended based on 100 parts by mass of the rubber component described above is preferably 0.35 or more, more preferably 0.40 or more and further more preferably 0.50 or more from the viewpoint of reducing a viscosity of unvulcanized rubber, and it is preferably 0.85 or less, more preferably 0.80 or less and further preferably 0.75 or less from the viewpoints of reducing a viscosity of the unvulcanized rubber, inhibiting the shrinkage, controlling the scorch and improving the heat resistance (the blend amounts of the glycerin fatty acid triester and the glycerin may be 0).

Rubber Composition:

Compounds which are used in common for the rubber compositions of the first embodiment and the second embodiment shall be described below.

The rubber composition of the present invention can be blended with the rubber component, the silica and the glycerin fatty acid esters in which an amount of monoester is controlled, each of which is described above, and in addition thereto, blend agents usually used in the rubber industry including, for example, antioxidants, softening agents, stearic acid, zinc oxide, vulcanization accelerators, vulcanization accelerator aids, vulcanizing agents, and the like can suitably be selected and blended therewith as long as the objects of the present invention are not retarded. Commercial products can suitably be used as the above blend agents.

Also, the rubber composition of the present invention is obtained by blending the rubber component, the silica and the glycerin fatty acid esters having the characteristics described above with various blend agents suitably selected to obtain a mixture and kneading and vulcanizing the mixture. The rubber composition is obtained, for example, by kneading, warming and extruding the mixture described above by means of a kneading equipment such as a roll, an internal mixer and the like, and it is vulcanized after fabrication, whereby it can suitably be used for applications of tire members of a tire, such as a tire tread, an under tread, a carcass, a sidewall, a bead part and the like.

A blend amount of zinc oxide in the rubber composition of the present invention is preferably 1.5 part by mass or more, more preferably 2.2 parts by mass or more based on 100 parts by mass of the rubber component from the viewpoints of the vulcanization characteristics and the elastic modulus, and it is preferably 12.0 parts by mass or less, more preferably 10.0 parts by mass or less from the viewpoint of the breaking strength resistance.

The reasons why the rubber composition thus constituted improves a dispersibility of silica and the like in the rubber composition, inhibits the rubber yellowing, does not retard the vulcanization rate, prevents the processability from being deteriorated by shrinkage, improves the heat resistance and makes the processability better are guessed as follows.

That is, in the rubber composition of the present invention, at least one of the glycerin fatty acid ester compositions of the first embodiment which hydrophobize the surface of silica and act as a lubricant, in which an amount of monoester is controlled and in which fatty acid has 8 to 28 carbon atoms, or the glycerin fatty acid monoester and the glycerin fatty acid diester having a specific ratio of the second embodiment is used in a blend system in which at least one rubber component selected from a natural rubber and/or a diene base synthetic rubber is blended with silica, whereby it can be reacted with the silica which is a filler as is the case with monoester single body, and a viscosity of the unvulcanized rubber is further reduced since it has a lubricant action. Also, it is guessed that the shrink property and a reduction in the toughness are improved as well by the silica hydrophobization action, the lubricant action and the plasticizing action. The glycerin fatty acid ester composition in which an amount of monoester is controlled, or the glycerin fatty acid monoester and the glycerin fatty acid diester having a specific ratio has a higher silica surface hydrophobization effect than those of tertiary amines, monoalkanolamides and the like and reduces a viscosity of the unvulcanized rubber, and it reduces the shrinkage and improves the processability more than the above compounds (these matters shall be further explained in detail in examples and comparative examples described later).

Tire and Viscosity Reduction Method for an Unvulcanized Rubber:

A tire can be produced by a usual process using the rubber composition of the present invention. For example, the rubber composition of the present invention blended with various blend agents as described above is extruded and processed into a tire member, for example, a member for a tread at an unvulcanized stage, and the member is stuck on a tire under molding by a usual method in a tire molding machine, whereby a green tire is molded. The above green tire is heated and pressed in a vulcanizing machine to obtain a tire which is excellent in a low heat generating property and has a low fuel consumption and which is excellent as well in a productivity because of a good processability of the above rubber composition.

Accordingly, the viscosity reduction method for an unvulcanized rubber according to the present invention is a viscosity reduction method for an unvulcanized rubber prepared by blending at least one rubber component selected from a natural rubber and/or a diene base synthetic rubber with silica and a glycerin fatty acid ester composition, wherein the fatty acid has 8 to 28 carbon atoms; the above composition contains glycerin fatty acid monoester and glycerin fatty acid diester; and a content of the glycerin fatty acid monoester in the above composition is 85% by mass or less.

Also, the viscosity reduction method for an unvulcanized rubber according to the present invention is a viscosity reduction method for an unvulcanized rubber prepared by blending at least one rubber component selected from a natural rubber and/or a diene base synthetic rubber with silica, glycerin fatty acid monoester and glycerin fatty acid diester, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

The preferred respective components and the preferred rages thereof are the same as those of the rubber compositions in the first embodiment and the second embodiment described above.

EXAMPLES

Next, the present invention shall be explained in further details with reference to production examples, examples and comparative examples, but the present invention shall by no means be restricted to the following examples.

Production Examples 1 to 9

Glycerin fatty acid ester compositions obtained by the following respective production methods were used. The contents of the respective components of glycerin fatty acid monoester (monoglyceride), glycerin fatty acid diester, glycerin fatty acid triester and glycerin in the respective glycerin fatty acid ester compositions produced were calculated by the methods described above to determine the respective compositions.

Production Example 1

Glycerin Fatty Acid Ester in which Fatty Acid has 8 Carbon Atoms (Used in Example 1)

A 1 liter four neck flask equipped with a stirrer, a dewatering cooling tube, a thermometer and a nitrogen-introducing tube was charged with 450 g of glycerin and 352 g of octanoic acid (Lunac 8-98, manufactured by Kao Corporation) (glycerin/fatty acid (mole ratio)=2.0), and sodium hydroxide dissolved in a small amount of water was added thereto in an amount of 10 ppm in terms of sodium. Then, the flask was heated up to 240° C. in about 1.5 hour under stirring at 400 r/min while causing nitrogen to flow to a space on the liquid at a rate of 100 ml/minute. After reached 240° C., water was removed while the acid component was refluxed in the flask, the reaction was continued at the above temperature. A content of the monoglyceride in the product after the reaction was 67 area %.

Subsequently, the reaction mixture was cooled down to 170° C., and glycerin was removed by distilling the mixture at the above temperature under a reduced pressure of 2.7 kPa. Further, steam was supplied to the flask at 150° C. and 2 kPa for 2 hours. Then, the mixture was subjected to adsorption filtration under applying pressure by means of Zeta Plus 30S (manufactured by CUNO Inc.) to obtain a monoglyceride-containing composition. The composition thus obtained was measured by GPC to thereby determine the compositions of the respective components.

Production Example 2

Glycerin Fatty Acid Ester in which Fatty Acid has 10 Carbon Atoms (Used in Example 2)

The reaction was carried out in the same manner as in Example 1, except that in Example 1 described above, octanoic acid was changed to an equimolar amount of decanoic acid (Lunac 10-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 3

Glycerin Fatty Acid Ester in which Fatty Acid has 12 Carbon Atoms (Used in Examples 3 and 12)

The reaction was carried out in the same manner as in Example 1, except that in Example 1 described above, octanoic acid was changed to an equimolar amount of lauric acid (Lunac L-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 4

Glycerin Fatty Acid Ester in which Fatty Acid has 16 Carbon Atoms (Used in Examples 4, 8 to 9, 13, 17 to 19, 22 to 23, 25 to 28 and Comparative Example 4)

The glycerin fatty acid ester composition used in Examples 4, 13, 19, 23 and 25 to 28 was produced by carrying out the reaction in the same manner as in Example 1, except that in Example 1 described above, octanoic acid was changed to an equimolar amount of palmitic acid (Lunac P-95, manufactured by Kao Corporation), removing glycerin in the same manner, and subjecting the mixture to adsorption filtration. The monoglyceride-containing composition obtained after the adsorption filtration was measured by GPC to thereby determine the compositions of the respective components.

Also, the glycerin fatty acid ester composition used in Comparative Example 4 was prepared by subjecting the glycerin fatty acid ester composition obtained in Production Example 4 to adsorption filtration.

The glycerin fatty acid ester composition used in Examples 8, 17 and 22 was prepared by mixing the glycerin fatty acid ester composition produced in Production Example 4 and the glycerin fatty acid ester composition used in Comparative Example 4 in a weight ratio of 70:30.

The glycerin fatty acid ester composition used in Examples 9 and 18 was prepared by mixing the glycerin fatty acid ester composition produced in Production Example 4 and the glycerin fatty acid ester composition used in Comparative Example 4 in a weight ratio of 35:65.

Production Example 5

Glycerin Fatty Acid Ester in which Fatty Acid has 16 Carbon Atoms (Used in Examples 7, 16, 21 and 30)

The reaction was carried out in the same manner as in Example 1, except that in Example 1 described above, an amount of glycerin was changed to 280 g and that octanoic acid was changed to 520 g of palmitic acid (Lunac P-95, manufactured by Kao Corporation) (glycerin/fatty acid (mole ratio)=1.5), and glycerin was removed in the same manner, followed by subjecting the mixture to adsorption filtration. The monoglyceride-containing composition obtained after the adsorption filtration was measured by GPC to thereby determine the compositions of the respective components.

Production Example 6

Glycerin Fatty Acid Ester in which Fatty Acid has 16 Carbon Atoms (Used in Example 10)

The reaction was carried out in the same manner as in Example 1, except that in Example 1 described above, an amount of glycerin was changed to 160 g and that octanoic acid was changed to 657 g of palmitic acid (Lunac P-95, manufactured by Kao Corporation) (glycerin/fatty acid (mole ratio)=0.67), and glycerin was removed in the same manner, followed by subjecting the mixture to adsorption filtration. The monoglyceride-containing composition obtained after the adsorption filtration was measured by GPC to thereby determine the compositions of the respective components.

Production Example 7

Glycerin Fatty Acid Ester in which Fatty Acid has 18 Carbon Atoms (Used in Examples 5, 14, 20, 24 and 29)

The reaction was carried out in the same manner as in Example 1, except that in Example 1 described above, octanoic acid was changed to an equimolar amount of stearic acid (Lunac S-98, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 8

Glycerin Fatty Acid Ester in which Fatty Acid has 22 Carbon Atoms (Used in Examples 6 and 15)

The reaction was carried out in the same manner as in Example 1, except that in Example 1 described above, octanoic acid was changed to an equimolar amount of behenic acid (Lunac BA, manufactured by Kao Corporation), and glycerin was removed in the same manner, followed by subjecting the mixture to adsorption filtration. The monoglyceride-containing composition obtained after the adsorption filtration was measured by GPC to thereby determine the compositions of the respective components.

Production Example 9

Glycerin Fatty Acid Ester in which Fatty Acid has 28 Carbon Atoms (Used in Example 11)

The reaction was carried out in the same manner as in Example 1, except that in Example 1 described above, octanoic acid was changed to an equimolar amount of montanoic acid (octacosanoic acid, manufactured by Tokyo Kasei Industry Co., Ltd.), and glycerin was removed in the same manner, followed by subjecting the mixture to adsorption filtration. The monoglyceride-containing composition obtained after the adsorption filtration was measured by GPC to thereby determine the compositions of the respective components.

Examples 1 to 30 and Comparative Examples 1 to 9

Rubber compositions were prepared by an ordinary method according to blend prescriptions shown in the following Table 1 to Table 7. The respective glycerin fatty acid ester compositions obtained in the production examples were described in upper columns in Table 1 to Table 7. Numerical values shown in lower columns than the columns of the glycerin fatty acid ester compositions in Table 1 to Table 7 are shown by mass parts.

The respective rubber compositions thus obtained were used to measure viscosity unvulcanized rubber viscosity, a scorch time, shrinkage and toughness@100.

The results thereof are shown in the following Table 1 to Table 7. The kinds of silicas are shown in Table 2 and Table 4, and the blend prescriptions in which the kinds of the silane coupling agents, and the like are changed are shown in Table 3 and Table 5.

Measuring Methods of Unvulcanized Rubber Viscosity and Scorch Time:

The unvulcanized rubber viscosity and the scorch time were measured according to JIS K 6300-1: 2001 (Mooney viscosity and Mooney scorch time).

The results were shown by indices in which set to 100 were the respective values of Comparative Example 1 in Table 1, Comparative Example 5 in Table 2, Comparative Example 6 in Table 3, Comparative Example 7 in Table 4, Comparative Example 8 in Table 5, Comparative Example 1 in Table 6 and Comparative Example 9 in Table 7. It is shown that the smaller the value of the unvulcanized rubber viscosity is, the better the workability is, and it is unfavorably shown that the larger the value of the scorch time is, the later the vulcanization starts and that the smaller the value thereof is, the more quickly the vulcanization starts to cause rubber yellowing.

Measuring Method of Shrinkage:

The respective rubber compositions obtained were kneaded by means of a lab mixer, and the resulting kneaded rubbers were wound on a roll of 70° C. and subjected to warming for 3 minutes and sheeting to 5 mm. A difference in a length of the sheet between immediately after sheeting and after left standing for 3 hours was measured, and the results thereof were shown by indices in which set to 100 as was the case with what was described above were the respective values of Comparative Example 1, Comparative Example 5, Comparative Example 6, Comparative Example 7, Comparative Example 8 and Comparative Example 9 in Table 1 to Table 7. It is shown that the larger the value thereof is, the larger the shrinkage is, and it is unfavorable.

Measuring Method of Toughness@100:

The unvulcanized rubber was vulcanized at 160° C. for 20 minutes and then degraded at 100° C. for 2 days (thermal degradation conditions). Then, the degraded rubber was subjected to a tensile test according to JIS K 6251, whereby Eb (elongation (%) in breakage) and Tb (tensile strength (MPa)) were measured to determine TF (toughness: Eb×Tb) after the thermal degradation, and the results thereof were shown by indices in which set to 100 as was the case with what was described above were the respective values of Comparative Example 1, Comparative Example 5, Comparative Example 6, Comparative Example 7, Comparative Example 8 and Comparative Example 9 in Table 1 to Table 7. It is shown that the larger the value thereof is, the higher the heat resistance (toughness) is.

TABLE 1

|  | Comparative Example | | | Example | | | | | | | | | Comparative Example | Example | |
| --- | --- | --- | --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 | 4 | 10 | 11 |
| Glycerin fatty acid ester composition | | | | | | | | | | | | | | | |
| Carbon number n Content (% by mass) | | | | 8 | 10 | 12 | 16 | 16 | 22 | 16 | 16 | 16 | 16 | 16 | 28 |
| Glycerin fatty acid monoester | | | | 56 | 61 | 62 | 64 | 57 | 51 | 52 | 73 | 84 | 95 | 37 | 49 |
| Glycerin fatty acid diester | | | | 42 | 36 | 36 | 34 | 41 | 47 | 44 | 25 | 14 | 4 | 47 | 48 |
| Glycerin fatty acid triester | | | | 1 | 2 | 1 | 1 | 1 | 1 | 2 | 1 | 1 | 0.5 | 13 | 1 |
| Glycerin | | | | 1 | 1 | 1 | 1 | 1 | 1 | 2 | 1 | 1 | 0.5 | 3 | 2 |
| E-SBR *1 | 137.5 | 137.5 | 137.5 | 137.5 | 137.5 | 137.5 | 137.5 | 137.5 | 137.5 | 137.5 | 137.5 | 137.5 | 137.5 | 137.5 | 137.5 |
| Carbon black *2 | 20 | 20 | 20 | 20 | 20 | 20 | 20 | 20 | 20 | 20 | 20 | 20 | 20 | 20 | 20 |
| Silica-1 *3 | 80 | 80 | 80 | 80 | 80 | 80 | 80 | 80 | 80 | 80 | 80 | 80 | 80 | 80 | 80 |
| Silane coupling agent A *4 | 8 | 8 | 8 | 8 | 8 | 8 | 8 | 8 | 8 | 8 | 8 | 8 | 8 | 8 | 8 |
| Stearic acid | 1 | 1 | 1 | 1 | 1 | 1 | 1 | 1 | 1 | 1 | 1 | 1 | 1 | 1 | 1 |
| Wax *5 | 2 | 2 | 2 | 2 | 2 | 2 | 2 | 2 | 2 | 2 | 2 | 2 | 2 | 2 | 2 |
| Antioxidant 6PPD *6 | 4 | 4 | 4 | 4 | 4 | 4 | 4 | 4 | 4 | 4 | 4 | 4 | 4 | 4 | 4 |
| Antioxidant TMQ *7 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Vulcanization accelerator DPG *8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Vulcanization accelerator MBTS *9 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Vulcanization accelerator CBS *10 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Tertiary amine *11 |  | 5 |  |  |  |  |  |  |  |  |  |  |  |  |  |
| Monoalkanolamide *12 |  |  | 5 |  |  |  |  |  |  |  |  |  |  |  |  |
| Glycerin fatty acid ester having above composition |  |  |  | 5 | 5 | 5 | 5 | 5 | 5 | 5 | 5 | 5 | 5 | 5 | 5 |
| Unvulcanized rubber viscosity | 100 | 88 | 83 | 83 | 82 | 84 | 82 | 80 | 81 | 83 | 81 | 80 | 78 | 90 | 84 |
| Scorch | 100 | 48 | 86 | 96 | 96 | 96 | 97 | 97 | 96 | 97 | 95 | 95 | 94 | 99 | 99 |
| Shrinkage | 100 | 125 | 135 | 110 | 110 | 110 | 110 | 110 | 110 | 110 | 110 | 115 | 135 | 105 | 110 |
| Toughness@100 | 100 | 87 | 85 | 98 | 97 | 100 | 101 | 97 | 98 | 100 | 97 | 97 | 93 | 100 | 94 |

TABLE 2

|  | Comparative Example | Example | | | | | | |
| --- | --- | --- | --- | --- | --- | --- | --- | --- |
|  | 5 | 12 | 13 | 14 | 15 | 16 | 17 | 18 |
| Glycerin fatty acid ester composition | | | | | | | | |
| Carbon number n Content (% by mass) |  | 12 | 16 | 18 | 22 | 16 | 16 | 16 |
| Glycerin fatty acid monoester |  | 62 | 64 | 57 | 51 | 52 | 73 | 84 |
| Glycerin fatty acid diester |  | 36 | 34 | 41 | 47 | 44 | 25 | 14 |
| Glycerin fatty acid triester |  | 1 | 1 | 1 | 1 | 2 | 1 | 1 |
| Glycerin |  | 1 | 1 | 1 | 1 | 2 | 1 | 1 |
| E-SBR *1 | 137.5 | 137.5 | 137.5 | 137.5 | 137.5 | 137.5 | 137.5 | 137.5 |
| Carbon black *2 | 20 | 20 | 20 | 20 | 20 | 20 | 20 | 20 |
| Silica-2 *13 | 80 | 80 | 80 | 80 | 80 | 80 | 80 | 80 |
| Silane coupling agent A *4 | 8 | 8 | 8 | 8 | 8 | 8 | 8 | 8 |
| Stearic acid | 1 | 1 | 1 | 1 | 1 | 1 | 1 | 1 |
| Wax *5 | 2 | 2 | 2 | 2 | 2 | 2 | 2 | 2 |
| Antioxidant 6PPD *6 | 4 | 4 | 4 | 4 | 4 | 4 | 4 | 4 |
| Antioxidant TMQ *7 | 0.3 | 0.3 | 0.3 | 0.3 | 0.3 | 0.3 | 0.3 | 0.3 |
| Zinc oxide | 2.5 | 2.5 | 2.5 | 2.5 | 2.5 | 2.5 | 2.5 | 2.5 |
| Vulcanization accelerator DPG *8 | 0.8 | 0.8 | 0.8 | 0.8 | 0.8 | 0.8 | 0.8 | 0.8 |
| Vulcanization accelerator MBTS *9 | 0.8 | 0.8 | 0.8 | 0.8 | 0.8 | 0.8 | 0.8 | 0.8 |
| Vulcanization accelerator CBS *10 | 0.9 | 0.9 | 0.9 | 0.9 | 0.9 | 0.9 | 0.9 | 0.9 |
| Sulfur | 1.5 | 1.5 | 1.5 | 1.5 | 1.5 | 1.5 | 1.5 | 1.5 |
| Glycerin fatty acid ester having above composition |  | 5 | 5 | 5 | 5 | 5 | 5 | 5 |
| Unvulcanized rubber viscosity | 100 | 83 | 80 | 78 | 78 | 81 | 79 | 77 |
| Scorch | 100 | 96 | 94 | 92 | 91 | 88 | 87 | 83 |
| Shrinkage | 100 | 110 | 110 | 105 | 105 | 110 | 110 | 110 |
| Toughness@100 | 100 | 101 | 102 | 97 | 99 | 100 | 97 | 97 |

TABLE 3

|  | Comparative Example 6 | Example 19 | Example 20 |
|---|---|---|---|
| Glycerin fatty acid ester composition |  |  |  |
| Carbon number n Content (% by mass) |  | 16 | 18 |
| Glycerin fatty acid monoester |  | 64 | 57 |
| Glycerin fatty acid diester |  | 34 | 41 |
| Glycerin fatty acid triester |  | 1 | 1 |
| Glycerin |  | 1 | 1 |
| E-SBR *1 | 137.5 | 137.5 | 137.5 |
| Carbon black *2 | 20 | 20 | 20 |
| Silica-1 *3 | 80 | 80 | 80 |
| Silane coupling agent B *14 | 8 | 8 | 8 |
| Stearic acid | 1 | 1 | 1 |
| Wax *5 | 2 | 2 | 2 |
| Antioxidant 6PPD *6 | 4 | 4 | 4 |
| Antioxidant TMQ *7 | 0.3 | 0.3 | 0.3 |
| Zinc oxide | 2.5 | 2.5 | 2.5 |
| Vulcanization accelerator DPG *8 | 0.8 | 0.8 | 0.8 |
| Vulcanization accelerator MBTS *9 | 0.8 | 0.8 | 0.8 |
| Vulcanization accelerator CBS *10 | 0.9 | 0.9 | 0.9 |
| Sulfur | 1.5 | 1.5 | 1.5 |
| Glycerin fatty acid ester having above composition |  | 5 | 5 |
| Unvulcanized rubber viscosity | 100 | 79 | 78 |
| Scorch | 100 | 98 | 98 |
| Shrinkage | 100 | 100 | 100 |
| Toughness@100 | 100 | 102 | 100 |

TABLE 4

|  | Comparative Example 7 | Example 21 | Example 22 |
|---|---|---|---|
| Glycerin fatty acid ester composition |  |  |  |
| Carbon number n Content (% by mass) |  | 16 | 16 |
| Glycerin fatty acid monoester |  | 52 | 73 |
| Glycerin fatty acid diester |  | 44 | 25 |
| Glycerin fatty acid triester |  | 2 | 1 |
| Glycerin |  | 2 | 1 |
| E-SBR *1 | 137.5 | 137.5 | 137.5 |
| Carbon black *2 | 20 | 20 | 20 |
| Silica-3 *15 | 80 | 80 | 80 |
| Silane coupling agent A *4 | 8 | 8 | 8 |
| Stearic acid | 1 | 1 | 1 |
| Wax *5 | 2 | 2 | 2 |
| Antioxidant 6PPD *6 | 4 | 4 | 4 |
| Antioxidant TMQ *7 | 0.3 | 0.3 | 0.3 |
| Zinc oxide | 2.5 | 2.5 | 2.5 |
| Vulcanization accelerator DPG *8 | 0.8 | 0.8 | 0.8 |
| Vulcanization accelerator MBTS *9 | 0.8 | 0.8 | 0.8 |
| Vulcanization accelerator CBS *10 | 0.9 | 0.9 | 0.9 |
| Sulfur | 1.5 | 1.5 | 1.5 |
| Glycerin fatty acid ester having above composition |  | 5 | 5 |
| Unvulcanized rubber viscosity | 100 | 82 | 80 |
| Scorch | 100 | 96 | 95 |
| Shrinkage | 100 | 110 | 110 |
| Toughness@100 | 100 | 100 | 98 |

TABLE 5

|  | Comparative Example 8 | Example 23 | Example 24 |
|---|---|---|---|
| Glycerin fatty acid ester composition |  |  |  |
| Carbon number n Content (% by mass) |  | 16 | 18 |
| Glycerin fatty acid monoester |  | 64 | 57 |
| Glycerin fatty acid diester |  | 34 | 41 |
| Glycerin fatty acid triester |  | 1 | 1 |
| Glycerin |  | 1 | 1 |
| E-SBR *1 | 137.5 | 137.5 | 137.5 |
| Carbon black *2 | 20 | 20 | 20 |
| Silica-1 *3 | 80 | 80 | 80 |
| Silane coupling agent C *16 | 8 | 8 | 8 |
| Stearic acid | 1 | 1 | 1 |
| Wax *5 | 2 | 2 | 2 |
| Antioxidant 6PPD *6 | 4 | 4 | 4 |
| Antioxidant TMQ *7 | 0.3 | 0.3 | 0.3 |
| Zinc oxide | 2.5 | 2.5 | 2.5 |
| Vulcanization accelerator DPG *8 | 0.8 | 0.8 | 0.8 |
| Vulcanization accelerator MBTS *9 | 0.8 | 0.8 | 0.8 |
| Vulcanization accelerator CBS *10 | 0.9 | 0.9 | 0.9 |
| Sulfur | 1.5 | 1.5 | 1.5 |
| Glycerin fatty acid ester having above composition |  | 5 | 5 |
| Unvulcanized rubber viscosity | 100 | 74 | 72 |
| Scorch | 100 | 95 | 94 |
| Shrinkage | 100 | 115 | 115 |
| Toughness@100 | 100 | 117 | 116 |

TABLE 6

|  | Comparative Example 1 | Example 4 | Example 25 | Example 26 | Example 27 |
|---|---|---|---|---|---|
| Glycerin fatty acid ester composition |  |  |  |  |  |
| Carbon number n Content (% by mass) |  | 16 | 16 | 16 | 16 |
| Glycerin fatty acid monoester |  | 64 | 64 | 64 | 64 |
| Glycerin fatty acid diester |  | 34 | 34 | 34 | 34 |
| Glycerin fatty acid triester |  | 1 | 1 | 1 | 1 |
| Glycerin |  | 1 | 1 | 1 | 1 |
| E-SBR *3 | 137.5 | 137.5 | 137.5 | 137.5 | 137.5 |
| Carbon black *2 | 20 | 20 | 20 | 20 | 20 |
| Silica-1 *3 | 80 | 80 | 80 | 80 | 80 |
| Silane coupling agent A *4 | 8 | 8 | 8 | 8 | 8 |
| Stearic acid | 1 | 1 | 1 | 1 | 1 |
| Wax *5 | 2 | 2 | 2 | 2 | 2 |
| Antioxidant 6PPD *6 | 4 | 4 | 4 | 4 | 4 |
| Antioxidant TMQ *7 | 0.3 | 0.3 | 0.3 | 0.3 | 0.3 |
| Zinc oxide | 2.5 | 2.5 | 2.5 | 2.5 | 2.5 |
| Vulcanization accelerator DPG *8 | 0.8 | 0.8 | 0.8 | 0.8 | 0.8 |
| Vulcanization accelerator MBTS *9 | 0.8 | 0.8 | 0.8 | 0.8 | 0.8 |
| Vulcanization accelerator CBS *10 | 0.9 | 0.9 | 0.9 | 0.9 | 0.9 |
| Sulfur | 1.5 | 1.5 | 1.5 | 1.5 | 1.5 |
| Glycerin fatty acid ester having above composition |  | 5 | 1 | 2.5 | 7 |
| Unvulcanized rubber viscosity | 100 | 82 | 95 | 91 | 75 |
| Scorch | 100 | 97 | 101 | 99 | 96 |
| Shrinkage | 100 | 110 | 100 | 105 | 115 |
| Toughness@100 | 100 | 101 | 102 | 104 | 105 |

TABLE 7

|  | Comparative Example | Example | | |
|---|---|---|---|---|
|  | 9 | 28 | 29 | 30 |
| Glycerin fatty acid ester composition |  |  |  |  |
| Carbon number n |  | 16 | 16 | 18 |
| Content (% by mass) |  |  |  |  |
| Glycerin fatty acid monoester |  | 64 | 57 | 52 |
| Glycerin fatty acid diester |  | 34 | 41 | 44 |
| Glycerin fatty acid triester |  | 1 | 1 | 2 |
| Glycerin |  | 1 | 1 | 2 |
| E-SBR *17 | 80 | 80 | 80 | 80 |
| Natural rubber-A *18 | 20 | 20 | 20 | 20 |
| Carbon black *2 | 20 | 20 | 20 | 20 |
| Silica-1 *3 | 5 | 5 | 5 | 5 |
| Silane coupling agent A *4 | 4 | 4 | 4 | 4 |
| Stearic acid | 1 | 1 | 1 | 1 |
| Wax *5 | 2 | 2 | 2 | 2 |
| Aromatic oil | 20 | 20 | 20 | 20 |
| Antioxidant 6PPD *6 | 1 | 1 | 1 | 1 |
| Zinc oxide | 2.5 | 2.5 | 2.5 | 2.5 |
| Vulcanization accelerator DPG *8 | 1.3 | 1.3 | 1.3 | 1.3 |
| Vulcanization accelerator MBTS *9 | 0.8 | 0.8 | 0.8 | 0.8 |
| Vulcanization accelerator CBS *10 | 0.7 | 0.7 | 0.7 | 0.7 |
| Sulfur | 1.5 | 1.5 | 1.5 | 1.5 |
| Glycerin fatty acid ester having above composition |  | 5 | 5 | 5 |
| Unvulcanized rubber viscosity | 100 | 76 | 78 | 78 |
| Scorch | 100 | 101 | 100 | 101 |
| Shrinkage | 100 | 105 | 105 | 105 |
| Toughness@100 | 100 | 101 | 102 | 102 |

*1 to *18 in Table 1 to Table 7 show the followings.
- *1: SBR#1723 (manufactured by JSR Corporation) (rubber component: 100 parts by mass, oil component: 37.5 parts by mass)
- *2: SEAST 7HM (N234) (manufactured by Tokai Carbon Co., Ltd.)
- *3: Nipsil VN3 manufactured by Tosoh Silica Corporation, BET surface area: 210 $m^2/g$, CTAB surface area: 144 $m^2/g$
- *4: Bis(3-triethoxysilylpropyl)tetrasulfide
- *5: Microcrystalline wax, Ozoace 0701 (manufactured by Nippon Seiro Co., Ltd.)
- *6: N-(1,3-dimethylbutyl)-N'-phenyl-p-phenylenediamine brand name: Nocrac 6C, (manufactured by Ouchi Shinko Chemical Industrial Co., Ltd.)
- *7: 2,2,4-trimethyl-1,2-dihydroquinoline polymer, trade name: NONFLEX RD-S (manufactured by Seiko Chemical Co., Ltd.)
- *8: Diphenylguanidine, brand name: NOCCELER D (manufactured by Ouchi Shinko Industrial Co., Ltd.)
- *9: di-2-benzothiazolyl disulfide, trade name: NOCCELER DM (manufactured by Ouchi Shinko Industrial Co., Ltd.)
- *10: N-(tert-butyl)-2-benzothiazolesulfenamide, trade name: Sanceler CM-G (manufactured by Sanshin Chemical Industrial Co., Ltd.)
- *11: FARMIN DM8098 (dimethylstearylamine, manufactured by Kao Corporation)
- *12: AMINON C-01 (lauric acid monoethanolamide, manufactured by Kao Corporation)
- *13: Silica Zeosil Premium 200MP, manufactured by Rhodia S.A., BET surface area: 222 $m^2/g$, CTAB surface area: 200 $m^2/g$
- *14: 3-Octanoylthiopropyltriethoxysilane, trade name: NXT, manufactured by Momentive Performance Materials Inc.
- *15: Silica Zeosil HRS 1200MP, manufactured by Rhodia S.A., BET surface area: 200 $m^2/g$, CTAB surface area: 195 $m^2/g$
- *16: trade name: VP Si363, manufactured by Evonik Degussa Co., Ltd., $(R^1)_m(R^2)_n Si$—$R^3$—$SH (R^1: OC_2H_5, R^2: O(C_2H_4O)_k$—$C_{13}H_{27}, R^3: $—$(CH_2)_3$—, m=average 1, n=average 2, k=average 5)
- *17: SBR#1500 (manufactured by JSR Corporation)
- *18: RSS#3

As apparent from the results shown in Table 1 to Table 7, it has become clear from the evaluation results of the unvulcanized rubber viscosity, the scorch time, the shrinkage and the toughness@100 that the rubber compositions produced in Examples 1 to 30 falling in the scope of the present invention are reduced in shrinkage, are not deteriorated in a processability and are improved as well in a heat resistance and a processability without increasing an unvulcanized rubber viscosity and retarding a vulcanization rate as compared with the rubber compositions produced in Comparative Examples 1 to 9 falling outside the scope of the present invention.

INDUSTRIAL APPLICABILITY

The rubber compositions of the present invention can suitably be used for applications of tire members of pneumatic tires, such as tire treads, under treads, carcasses, side walls, bead parts and the like.

What is claimed is:

1. A rubber composition prepared by blending at least one rubber component selected from a natural rubber and/or a diene base synthetic rubber with silica and a glycerin fatty acid ester composition, wherein a blend amount of the glycerin fatty acid ester composition is 0.5 to 15 parts by mass based on 100 parts by mass of the rubber component; the fatty acid has 8 to 28 carbon atoms; the glycerin fatty acid ester composition comprises glycerin fatty acid monoester having two hydroxyl groups on carbon atoms of the glycerin part and glycerin fatty acid diester having one hydroxyl group on a carbon atom of the glycerin part; and a content of the glycerin fatty acid monoester in the glycerin fatty acid ester composition is 85% by mass or less.

2. The rubber composition as described in claim 1, wherein a content of the glycerin fatty acid monoester in the glycerin fatty acid ester composition is 35 to 85% by mass.

3. The rubber composition as described in claim 1, wherein a content of the glycerin fatty acid diester in the glycerin fatty acid ester composition is 10 to 65% by mass.

4. The rubber composition as described in claim 1, wherein a mass ratio of the glycerin fatty acid monoester/the glycerin fatty acid diester in the glycerin fatty acid ester composition is 0.5 to 10.

5. The rubber composition as described in claim 1, wherein a content of the glycerin fatty acid monoester in the glycerin fatty acid ester composition is 50 to 85% by mass; and a total content of the glycerin fatty acid diester and glycerin fatty acid triester is 15 to 50% by mass.

6. The rubber composition as described in claim 1, wherein a content of the glycerin fatty acid monoester in the glycerin fatty acid ester composition is 50 to 85% by mass, and a content of the glycerin fatty acid diester is 15 to 50% by mass.

7. The rubber composition as described in claim 1, wherein a content of the glycerin fatty acid triester in the glycerin fatty acid ester composition is 10% by mass or less.

8. The rubber composition as described in claim 1, wherein a blend amount of the glycerin fatty acid ester composition is 0.5 to 20 parts by mass based on 100 parts by mass of the silica.

9. The rubber composition as described in claim 1, obtained by blending at least one rubber component selected from the natural rubber and/or the diene base synthetic rubber with the silica and the glycerin fatty acid ester composition and then kneading and vulcanizing the mixture.

10. A rubber composition prepared by blending at least one rubber component selected from a natural rubber and/or a diene base synthetic rubber with silica, glycerin fatty acid monoester having two hydroxyl groups on carbon atoms of the glycerin part and glycerin fatty acid diester having one hydroxyl group on a carbon atom of the glycerin part, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

11. The rubber composition as described in claim 10, wherein 0.25 to 10 parts by mass of the glycerin fatty acid monoester based on 100 parts by mass of the rubber component is blended.

12. The rubber composition as described in claim 10, wherein 0.25 to 10 parts by mass of the glycerin fatty acid diester based on 100 parts by mass of the rubber component is blended.

13. The rubber composition as described in claim 10, obtained by blending at least one rubber component selected from the natural rubber and/or the diene base synthetic rubber with the silica, the glycerin fatty acid monoester and the glycerin fatty acid diester and then kneading and vulcanizing the mixture.

14. The rubber composition as described in claim 1, wherein 5 to 200 parts by mass of the silica based on 100 parts by mass of the rubber component is blended.

15. The rubber composition as described in claim 10, wherein 5 to 200 parts by mass of the silica based on 100 parts by mass of the rubber component is blended.

16. The rubber composition as described in claim 1, further blended with a silane coupling agent.

17. The rubber composition as described in claim 10, further blended with a silane coupling agent.

18. A production process for the rubber composition as described in claim 1, comprising a step of blending at least one rubber component selected from a natural rubber and/or a diene base synthetic rubber with silica and glycerin fatty acid ester to obtain a mixture and then kneading and vulcanizing the mixture.

19. A production process for the rubber composition as described in claim 10, comprising a step of blending at least one rubber component selected from a natural rubber and/or a diene base synthetic rubber with silica and glycerin fatty acid ester to obtain a mixture and then kneading and vulcanizing the mixture.

20. A tire prepared by using the rubber composition as described in claim 1 for a tire member.

21. A tire prepared by using the rubber composition as described in claim 10 for a tire member.

22. A viscosity reduction method for an unvulcanized rubber prepared by blending at least one rubber component selected from a natural rubber and/or a diene base synthetic rubber with silica and a glycerin fatty acid ester composition, wherein a blend amount of the glycerin fatty acid ester composition is 0.5 to 15 parts by mass based on 100 parts by mass of the rubber component; the fatty acid has 8 to 28 carbon atoms; the glycerin fatty acid ester composition comprises glycerin fatty acid monoester having two hydroxyl groups on carbon atoms of the glycerin part and glycerin fatty acid diester having one hydroxyl group on a carbon atom of the glycerin part; and a content of the glycerin fatty acid monoester in the glycerin fatty acid ester composition is 85% by mass or less.

23. A viscosity reduction method for an unvulcanized rubber prepared by blending at least one rubber component selected from a natural rubber and/or a diene base synthetic rubber with silica, glycerin fatty acid monoester having two hydroxyl groups on carbon atoms of the glycerin part and glycerin fatty acid diester having one hydroxyl group on a carbon atom of the glycerin part, wherein the fatty acid has 8 to 28 carbon atoms; a total blend amount of the glycerin fatty acid monoester and the glycerin fatty acid diester is 0.5 to 15 parts by mass based on 100 parts by mass of the rubber component; and a blend mass ratio of the glycerin fatty acid monoester/the glycerin fatty acid diester is 0.5 to 10.

* * * * *